(12) United States Patent
Reed et al.

(10) Patent No.: US 12,373,408 B1
(45) Date of Patent: Jul. 29, 2025

(54) REORGANIZATION OF A DATA SET

(71) Applicant: International Business Machines Corporation, Armonk, NY (US)

(72) Inventors: David C. Reed, Tucson, AZ (US); Ryan Arthur Bouchard, Tucson, AZ (US); Michael R. Scott, Ocean View, HI (US); Parker Mathewson, Denver, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/652,542

(22) Filed: May 1, 2024

(51) Int. Cl.
  *G06F 16/00* (2019.01)
  *G06F 16/215* (2019.01)
  *G06F 17/12* (2006.01)

(52) U.S. Cl.
  CPC ............ *G06F 16/215* (2019.01); *G06F 17/12* (2013.01)

(58) Field of Classification Search
  CPC .... G06F 16/215; G06F 17/12; G06F 11/3612; G06F 11/26; H04L 41/16; H04L 41/147; H04W 56/0015; H04J 3/0667
  See application file for complete search history.

(56) References Cited

U.S. PATENT DOCUMENTS

| | | | |
|---|---|---|---|
| 7,890,675 B2 | 2/2011 | Aranguren et al. | |
| 8,095,764 B1 | 1/2012 | Bauer et al. | |
| 8,095,768 B2 | 1/2012 | Lehr et al. | |
| 8,291,186 B2 | 10/2012 | Chauvet et al. | |
| 8,818,932 B2 | 8/2014 | Nolan et al. | |
| 8,875,150 B2 | 10/2014 | Ferdous et al. | |
| 8,966,218 B2 | 2/2015 | Reed et al. | |
| 9,489,630 B2 | 11/2016 | Achin et al. | |
| 9,582,522 B2 | 2/2017 | Konik et al. | |
| 9,811,439 B1* | 11/2017 | Barrett ................ G06F 11/3612 |
| 10,579,494 B2 | 3/2020 | Schmidt et al. | |
| 10,901,788 B2 | 1/2021 | Venkadasamy et al. | |
| 11,023,148 B2 | 6/2021 | Srivastava et al. | |
| 2020/0106677 A1 | 4/2020 | Pathak | |
| 2023/0124404 A1 | 4/2023 | He et al. | |
| 2024/0163000 A1* | 5/2024 | Agarwal ........... H04W 56/0015 |
| 2024/0291724 A1* | 8/2024 | Saha ....................... H04L 41/16 |

OTHER PUBLICATIONS

Mainframestechhelp, "REPRO Command," Mainframetechhelp, 2024, 16 pages, retrieved from https://www.mainframestechhelp.com/utilities/idcams/repro.htm.
Anonymous, "VSAM DASD Freespace Manager," IP.com Prior Art Database, Technical Disclosure No. IPCOM000265354D, Mar. 31, 2021, 5 pages.

* cited by examiner

*Primary Examiner* — Yicun Wu
(74) *Attorney, Agent, or Firm* — Zilka-Kotab, P.C.

(57) ABSTRACT

A computer-implemented method (CIM), according to one embodiment, includes performing a reorganization analysis for mitigating latency during reorganization of a data set. The reorganization analysis includes using regression analysis to predict a time duration that reorganization of the data set will take based on a total size of the data set, relating the predicted time duration to a previous data set reorganization time duration, and performing linear extrapolation to estimate a time at which the total size of the data set will exceed a predetermined percentage of a maximum size of the data set. The method further includes reorganizing the data set before the estimated time, where the data set is reorganized at a time determined based on the reorganization analysis or derivative thereof.

20 Claims, 8 Drawing Sheets

REORGANIZATION OF A DATA SET

BACKGROUND

The present invention relates to data storage environments, and more specifically, this invention relates to reorganization of data sets.

A data set is a collection of data. As records are added and deleted from a data set, gaps are created in the data set that consume space in data storage of a data storage system and increase an overall size of the data set. Eventually, at a point at which a data set cannot be extended, records can no longer be written to a data set because the data set is full of gaps and/or data. In some use cases, in response to a determination that the data set is full, at least some data of the data set and/or write operations originally intended for the data set are allocated to a different location of a data storage system.

SUMMARY

A computer-implemented method (CIM), according to one embodiment, includes performing a reorganization analysis for mitigating latency during reorganization of a data set. The reorganization analysis includes using regression analysis to predict a time duration that reorganization of the data set will take based on a total size of the data set, relating the predicted time duration to a previous data set reorganization time duration, and performing linear extrapolation to estimate a time at which the total size of the data set will exceed a predetermined percentage of a maximum size of the data set. The method further includes reorganizing the data set before the estimated time, where the data set is reorganized at a time determined based on the reorganization analysis or derivative thereof.

A computer program product (CPP), according to another embodiment, includes a set of one or more computer-readable storage media, and program instructions, collectively stored in the set of one or more storage media, for causing a processor set to perform the foregoing method.

A computer system (CS), according to another embodiment, includes a processor set, a set of one or more computer-readable storage media, and program instructions, collectively stored in the set of one or more storage media, for causing the processor set to perform the foregoing method.

Other aspects and embodiments of the present invention will become apparent from the following detailed description, which, when taken in conjunction with the drawings, illustrate by way of example the principles of the invention.

DETAILED DESCRIPTION

Figure 1:
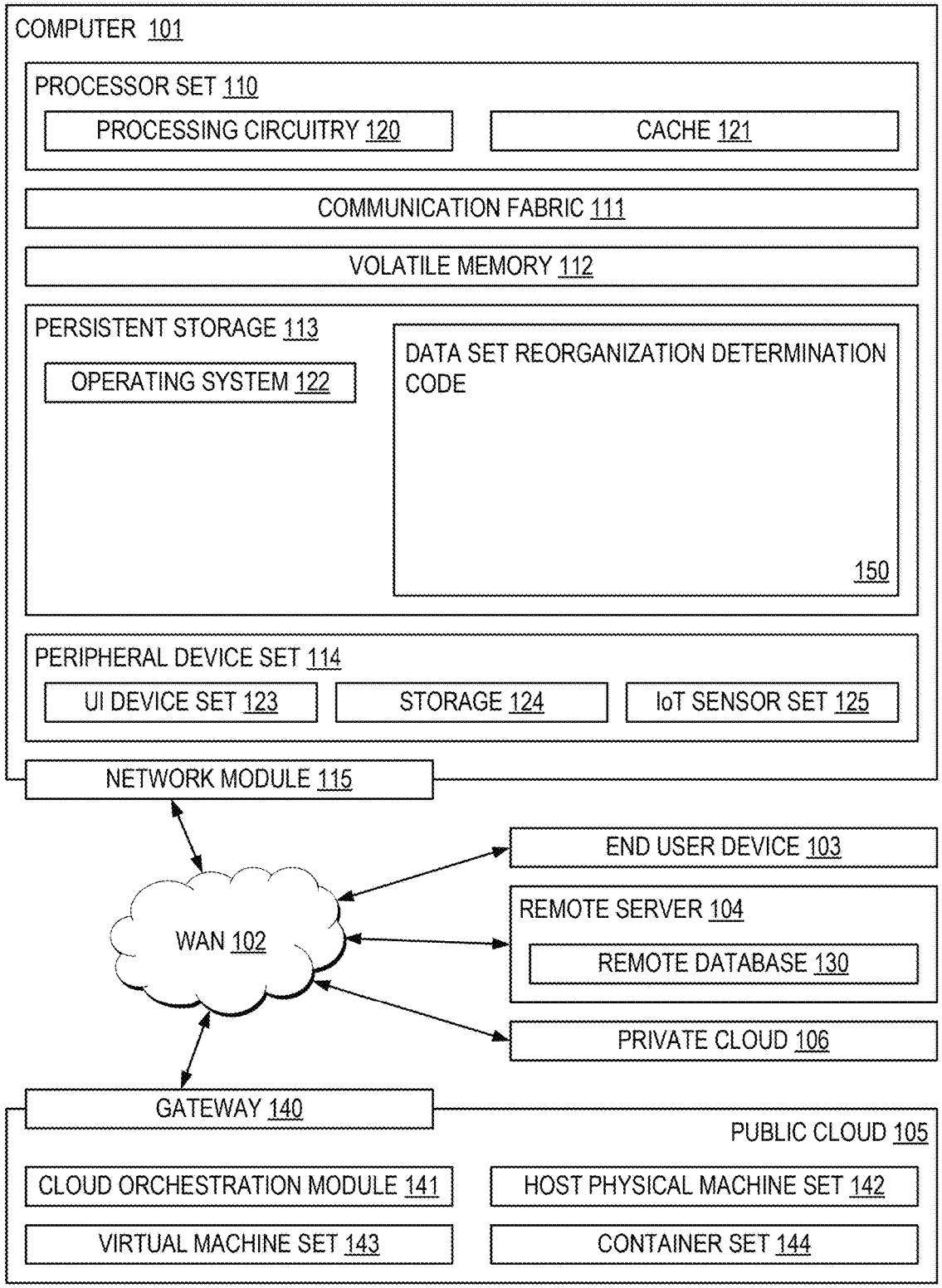
FIG. 1 is a diagram of a computing environment, in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for determining when to reorganize a data set.

In one general embodiment, a CIM includes performing a reorganization analysis for mitigating latency during reorganization of a data set. The reorganization analysis includes using regression analysis to predict a time duration that reorganization of the data set will take based on a total size of the data set, relating the predicted time duration to a previous data set reorganization time duration, and performing linear extrapolation to estimate a time at which the total size of the data set will exceed a predetermined percentage of a maximum size of the data set. The method further includes reorganizing the data set before the estimated time, where the data set is reorganized at a time determined based on the reorganization analysis or derivative thereof.

In another general embodiment, a CPP includes a set of one or more computer-readable storage media, and program instructions, collectively stored in the set of one or more storage media, for causing a processor set to perform the foregoing method.

In another general embodiment, a CS includes a processor set, a set of one or more computer-readable storage media, and program instructions, collectively stored in the set of one or more storage media, for causing the processor set to perform the foregoing method.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as data set reorganization determination code of block 150 for determining when to reorganize a data set. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICROSERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

In some aspects, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various embodiments.

Figure 2:
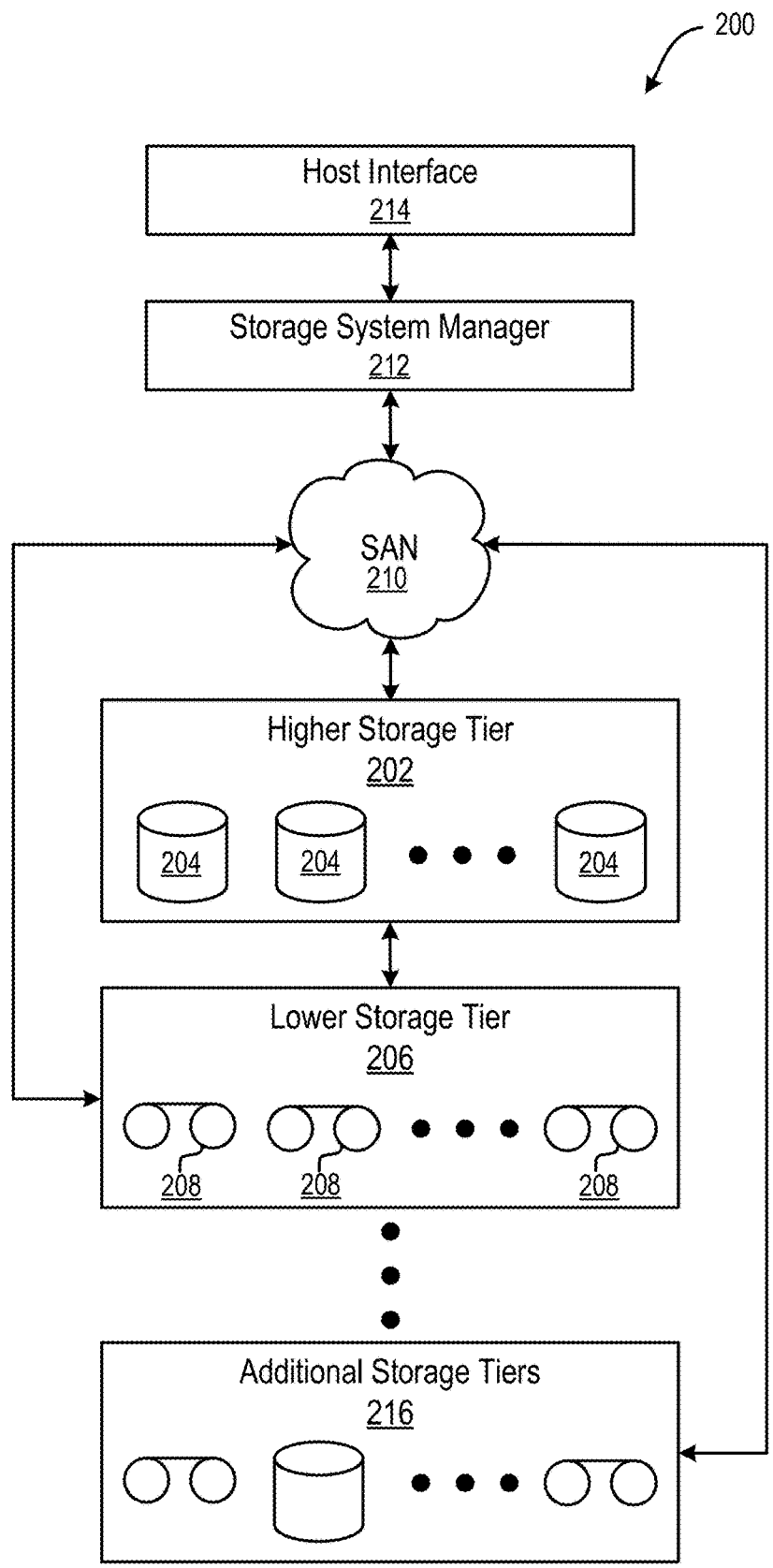
FIG. 2 is a diagram of a tiered data storage system, in accordance with one embodiment of the present invention.

Now referring to FIG. 2, a storage system 200 is shown according to one embodiment. Note that some of the elements shown in FIG. 2 may be implemented as hardware and/or software, according to various embodiments. The storage system 200 may include a storage system manager 212 for communicating with a plurality of media and/or drives on at least one higher storage tier 202 and at least one lower storage tier 206. The higher storage tier(s) 202 preferably may include one or more random access and/or direct access media 204, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 206 may preferably include one or more lower performing storage media 208, including sequential access media such as magnetic tape in tape drives and/or optical media, slower accessing HDDs, slower accessing SSDs, etc., and/or others noted herein or known in the art. One or more additional storage tiers 216 may include any combination of storage memory media as desired by a designer of the system 200. Also, any of the higher storage tiers 202 and/or the lower storage tiers 206 may include some combination of storage devices and/or storage media.

The storage system manager 212 may communicate with the drives and/or storage media 204, 208 on the higher storage tier(s) 202 and lower storage tier(s) 206 through a network 210, such as a SAN, as shown in FIG. 2, Internet Protocol (IP) network, or some other suitable network type. The storage system manager 212 may also communicate with one or more host systems (not shown) through a host interface 214, which may or may not be a part of the storage system manager 212. The storage system manager 212 and/or any other component of the storage system 200 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 200 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 202, may include a majority of SSD storage media for storing data in a higher performing storage environment, and remaining storage tiers, including lower storage tier 206 and additional storage tiers 216 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 202, while data not having one of these attributes may be stored to the additional storage tiers 216, including lower storage tier 206. Of course, one of skill in the art, upon reading the present descriptions, may devise many other combinations of storage media types to implement into different storage schemes, according to the embodiments presented herein.

According to some embodiments, the storage system (such as 200) may include logic configured to receive a request to open a data set, logic configured to determine if the requested data set is stored to a lower storage tier 206 of a tiered data storage system 200 in multiple associated portions, logic configured to move each associated portion of the requested data set to a higher storage tier 202 of the tiered data storage system 200, and logic configured to assemble the requested data set on the higher storage tier 202 of the tiered data storage system 200 from the associated portions.

As mentioned elsewhere above, a data set is a collection of data. As records are added and deleted from a data set, gaps are created in the data set that consume space in data storage of a data storage system and increase an overall size of the data set. Eventually, at a point at which a data set cannot be extended, records can no longer be written to a data set because the data set is full of gaps and/or data.

In some data storage systems, control data sets are often used by applications to keep track of application data on a Direct-access storage device (DASD). These data sets grow over time. As records are added and deleted it can create gaps as well that also cause the data sets to take up additional space on DASD. In some use cases, these control data sets reach a point at which the control data sets can no longer be extended, and additional records can no longer be written to these data sets.

In order to prevent system and application outages that have a critical impact to clients, the techniques of embodiments and approaches described herein optimize a timeframe for data reorganization by predicting when critical data sets, e.g., such as control data sets, will need to be reallocated or reorganized. This prediction is made by monitoring the write activity when a data set starts to exceed a predetermined percentage of a maximum size of the data set, e.g., 90%. Based on this write activity, a window of expected time until the data set will no longer be able to accept updates is computed. Next, an activity of reads and writes are analyzed from previous time periods based on the size of that window of opportunity. Finally, based on the size of the data set and previous reorganizations of similar data sets, an amount of time needed to perform the optimized reorganization is predicted. Using these criteria, the optimal reorganization time is established, and the data set is reorganized at that time.

Now referring to FIG. 3, a flowchart of a method 300 is shown according to one embodiment. The method 300 may be performed in accordance with aspects of the present invention in any of the environments depicted in FIGS. 1-6, among others, in various embodiments. Of course, more or fewer operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by a processing circuit, or some other device having one or more processors therein. The processor, e.g., processing circuit(s), chip(s), and/or module(s) implemented in hardware and/or software, and preferably having at least one hardware component, may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

The operations of method 300 include techniques that can support different types of applications in order to mitigate system downtime during reorganization of one or more data sets of a data storage environment. In some illustrative examples, the techniques may be used in use cases that involve a removable media manager controlling a data set, e.g., magnetic recording tape, optical volumes, etc. In some other approaches, these techniques may be deployed in any type of data storage system in order to prevent system and application outages from occurring as a result of data sets reaching a maximum size.

It should be noted that, in some preferred approaches, the data set mentioned in operations described herein is preferably a collection of metadata rather than user data. However, in some other approaches, the operations of method 300 and other techniques described herein may be used on any data sets that grow over time and need to be reallocated and/or reorganized.

Figure 3A:
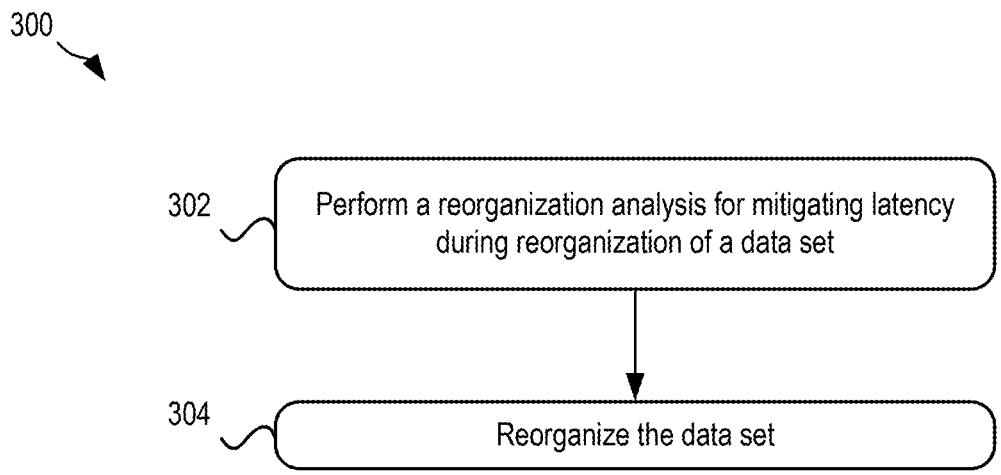
FIG. 3A is a flowchart of a method, in accordance with one embodiment of the present invention.
Figure 3B:
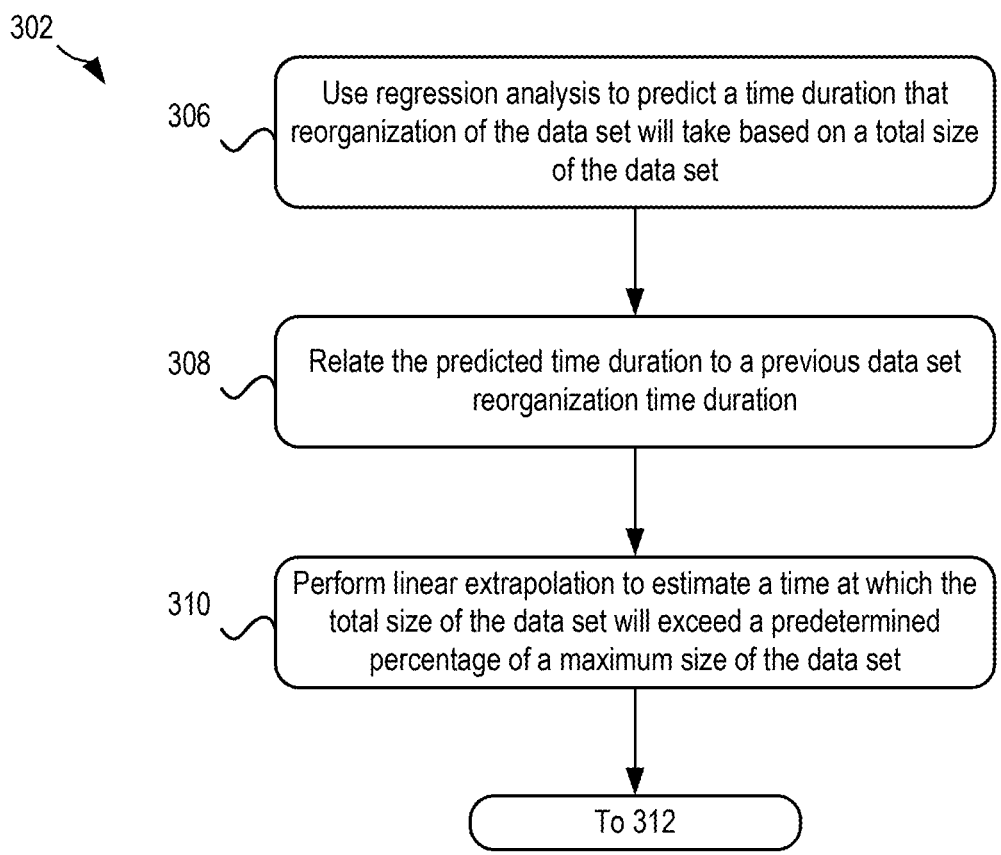
FIG. 3B is a flowchart of sub-operations of an operation of the flowchart of FIG. 3A, in accordance with one embodiment of the present invention.
Figure 3B:
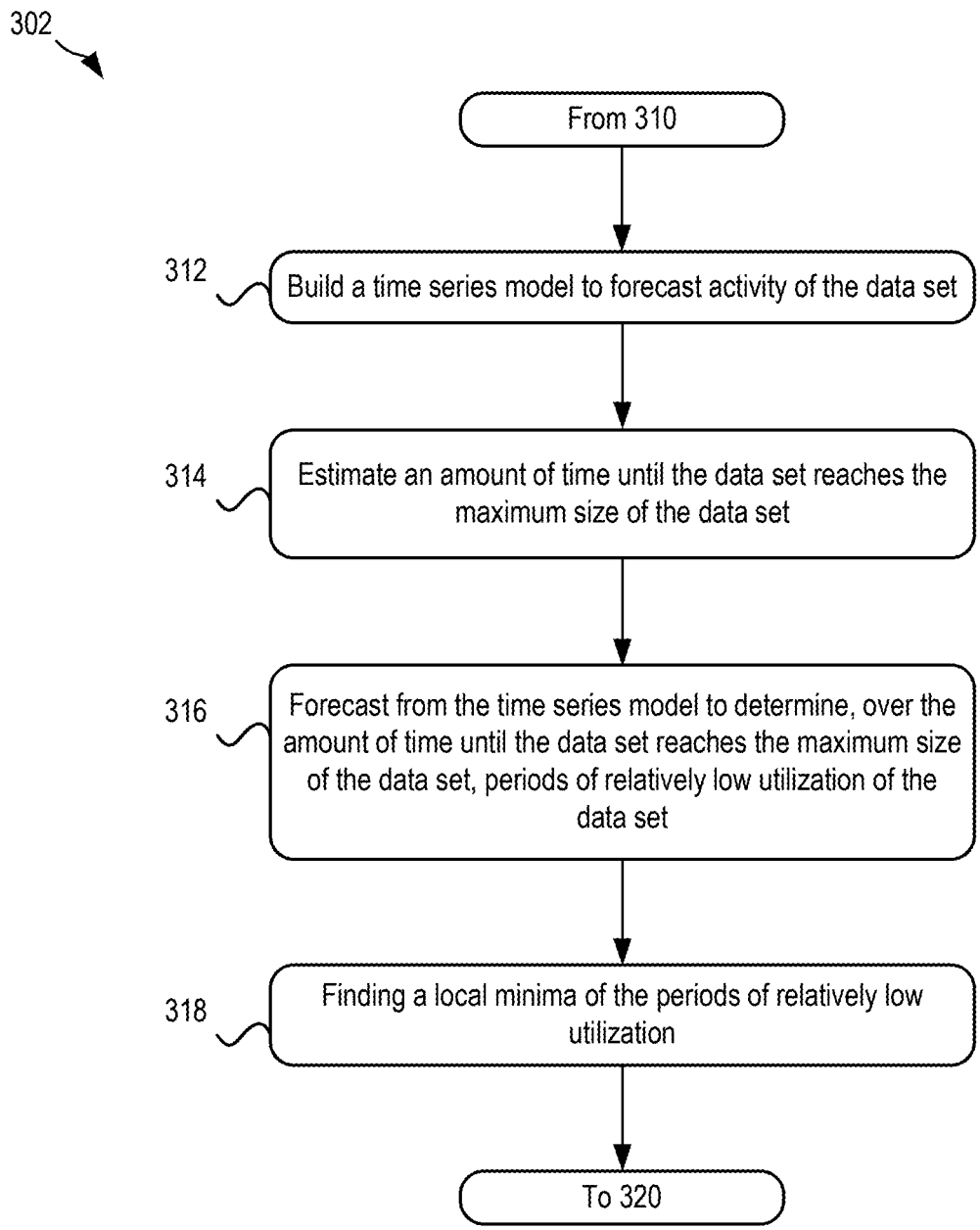
Figure 3B:
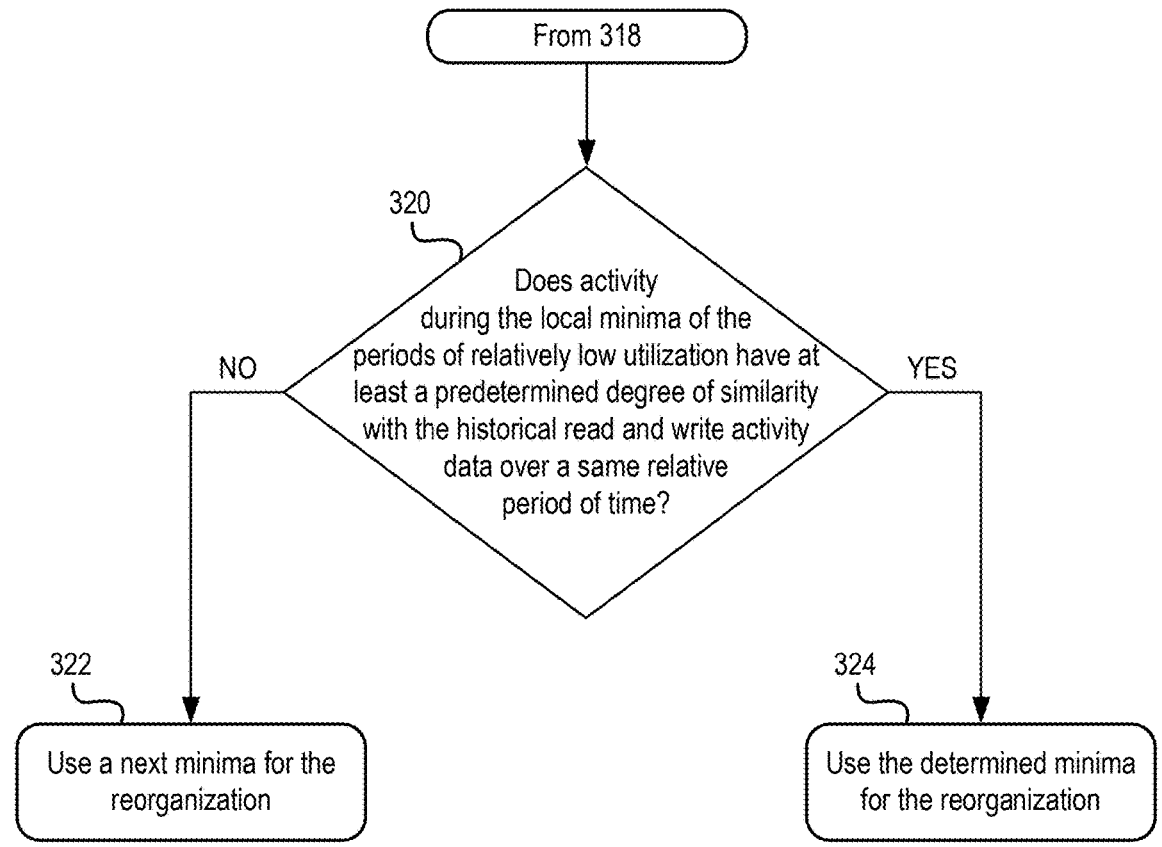

Operation 302 of method 300 includes performing a reorganization analysis for mitigating latency during reorganization of a data set. For context, it may be prefaced that the reorganization analysis is preferably performed in order to determine how to reorganize the data set. Accordingly, various sub-operations described below how to determine to reorganize the data set. Looking to FIG. 3B, exemplary sub-operations of performing a reorganization analysis are illustrated in accordance with one embodiment, one or more of which may be used to perform operation 302 of FIG. 3A. However, it should be noted that the sub-operations of FIG. 3B are illustrated in accordance with one embodiment which is in no way intended to limit the invention.

In some approaches, the reorganization analysis includes using regression analysis to predict a time duration that reorganization of the data set will take based on a total size of the data set, e.g., see sub-operation 306. The total size of the data set, in some approaches, includes gaps between data of the data set and the data of the data set, while, in some other approaches, the total size of the data set includes only data of the data set and does not include the gaps therebetween. The regression analysis used to predict the time duration that the reorganization of the data set will take, in some approaches, includes linear regression analysis. The total size of the data set may be an independent variable that is compared with a predetermined equation to determine an initial prediction of the duration that reorganization of the data set will take. For example, in some approaches, the predetermined equation may predict that the duration is equal the total size of the data set divided by a write rate of a component that is available to perform the reorganization.

In some approaches, a predicted time duration determined using the techniques described above is used in other operations of method 300. In some other approaches in which the time duration is an initial prediction of the duration that reorganization of the data set will take, the predicted time duration may be compared with other previous data set reorganization durations in order to determine whether the initial prediction is accurate, e.g., in order to further refine and/or verify that the predicted time duration is an accurate prediction. For example, in some approaches, the predicted time duration is related to a previous data set reorganization time duration, where the previous data set reorganization time duration is a dependent variable that may be of the same data set or another data set with at least a predetermined degree of similarity with the data set, e.g., see sub-operation 308.

A log detailing previous data set reorganization time durations for a plurality of other data sets may, in some approaches, be accessed in order to relate the predicted time duration to a previous data set reorganization time duration. Previous reorganization time(s) of one or more of the other data sets having at least a predetermined degree of similarity with the data set may be related to the predicted time duration. In some other approaches, the previous reorganization time(s) may be based on previous reorganization of the data set. In such approaches, one or more of these previous reorganization time(s) that were performed for the data set may be related to the predicted time duration, e.g., a previous reorganization time performed when the data set was within a predetermined size of the current size of the data set.

Sub-operation 310 includes performing linear extrapolation to estimate a time at which the total size of the data set will exceed a predetermined percentage of a maximum size of the data set. In some approaches, this linear extrapolation is performed using information about one or more of the related reorganization time durations mentioned above. During this linear extrapolation, in some approaches, an estimation is made as to when the data set will hits 90% of a maximum size (including all extents). In some approaches, the estimated time may be used to update and/or predict the time duration that reorganization of the data set will take. For example, a processing potential at the estimated time may be determined and incorporated into the predicted time duration, e.g., where relatively more processing resources being available may relatively reduce the predicted time duration and relatively less processing resources being available may relatively increase the predicted time duration.

It should be noted that, with the predicted time duration determined and the time at which the total size of the data set will exceed a predetermined percentage of a maximum size of the data set estimated, in some approaches, additional operation(s) of the reorganization analysis are performed for determining when to reorganize the data set. For example, in response to a determination that a difference of the estimated time and a current time is at least a predetermined amount of time (e.g., at least magnitudes greater) greater than the predicted time duration, additional analysis may be performed in order to determine how to efficiently perform the reorganization. In contrast, in response to a determination that the difference of the estimated time and a current time is not at least a predetermined amount of time (e.g., at least magnitudes greater) greater than the predicted time duration, the reorganization of the data set may optionally be performed, e.g., in order to prevent outages of systems and applications that rely on and use the data set.

In some approaches, the reorganization analysis may additionally and/or alternatively include building a time series model to forecast activity of the data set, e.g., see sub-operation 312. For context, the activity of the data set may be forecasted in the time series in order to determine periods of time in which the data set is used relatively less (periods of time in which data operations associated with the data set would be relatively least interrupted by the performance of the reorganization of the data set). Accordingly, in some approaches, building the time series model may include monitoring read and write activity associated with the data set. This activity may, in some approaches, be recorded in a log and/or journal by a type of source that logs data, e.g., recorded in a journal data set on a direct access storage device (DASD) by using historical read and write activity data. In some approaches, this activity data may be used to train and validate the output of an AI-based prediction model that is applied (once trained) to perform operations of the reorganization analysis. Techniques that would become apparent to one of ordinary skill in the art after reading the descriptions herein may be used for building the time series model using data obtained during the monitoring, e.g., data point scatter plotting along a time axis, creating a line chart, creating a use-based heat map, creating heat maps for different types of use of the data set (e.g., read operations versus write operations), etc.

The reorganization analysis may additionally and/or alternatively include estimating an amount of time until the data set reaches the maximum size of the data set. In some preferred approaches, the estimating is performed by extrapolating, from the linear regression analysis, utilization of the data set over time. The utilization of the data set over time may, in some approaches, be detailed in write records for the data set (which may be based on write logs of applications that use the data set) to estimate amount of time until the data set will be fully utilized.

For context, the estimated amount of time until the data set reaches the maximum size of the data set may serve as a timeline by which the reorganization is preferably initiated and/or completed. Accordingly, as will now be described below, in some approaches, the reorganization analysis includes determining along portions of the time series (from a current time to an end of the estimated amount of time) when to initiate the reorganization of the data set.

Sub-operation 316 includes forecasting from the time series model to determine, over the amount of time until the data set reaches the maximum size of the data set, periods of relatively low utilization of the data set that are likely to occur before the data set fills up. Although these forecasts may be made specifically with respect to the data set, in some other approaches, the forecast may additionally and/or alternatively be made with respect to a data storage system that has access to the data set, e.g., with respect to relatively low read/write times of the data storage system.

In some preferred approaches, the periods of relatively low utilization of the data set satisfy one or more predetermined conditions. For example, in some of these approaches, the periods of relatively low utilization of the data set are within a period of time that the data set is predicted to be utilized at least a predetermined amount, e.g., when the data set is at least 90% utilized. This period of time may, in some approaches, optionally extend to a point in time in which the data set is estimated to be filled (which may be determined from sub-operation 308 and/or sub-operation 314). The periods of relatively low utilization of the data set may, in some approaches, additionally and/or alternatively be defined by a predetermined number of data points, e.g., points of the time series model used for the forecasting. In some other approaches, the periods of relatively low utilization of the data set may additionally and/or alternatively be defined as a predetermined percentage of data points. In yet some other approaches, the periods of relatively low utilization of the data set may additionally and/or alternatively be defined by points that fall below a predetermined threshold, e.g., periods of time along the time series model during which read operations performed on the data set fall below a predetermined threshold, periods of time along the time series model during which write operations performed on the data set fall below a predetermined threshold, etc. In yet some other approaches, a queue may be queried to determine anticipated periods of relatively low utilization of the data set (in approaches in which at least some read and/or write requests are queued).

Sub-operation 318 includes finding a local minima of the periods of relatively low utilization to determine the optimal upcoming windows for reorganization of the data set. In some approaches, the reorganization of the data set is performed at a time of the identified local minima. However, in some other approaches, additional processing may be performed in order to determine when to perform the reorganization of the data set. For example, although the local minima may appear to be an ideal time to schedule and/or perform the reorganization of the data set, because use of the data set may change from time to time, in some approaches, method 300 includes performing an optional check may be performed to determine whether predicted activity (from the forecast) closely matches historical data over same period, e.g., see sub-operations 320-324.

Sub-operation 320 includes determining whether activity during the local minima of the periods of relatively low utilization has at least a predetermined degree of similarity with the historical read and write activity data over a same relative period of time, e.g., the relatively low utilization has historically occurred at the same time each day, the relatively low utilization has historically occurred on the same day each week, etc. This additional check may be performed, in some approaches, to ensure that the local minima is not a result of a miscalculation during the forecasting. Furthermore, this additional check may be performed, in some approaches, to increase the likelihood that the forecasted minima period of relatively low utilization is likely to occur (based on historical statistics).

In some approaches, in response to a determination that the activity during the local minima of the periods of relatively low utilization has at least a predetermined degree of similarity with the historical read and write activity data over a same relative period of time, e.g., as illustrated by the "YES" logical path of decision 320, the local minima of the periods of relatively low utilization is used for the reorganization, e.g., see sub-operation 324. In contrast, in some other approaches, a determination is made that the activity during the local minima of the periods of relatively low utilization does not have at least the predetermined degree of similarity with the historical read and write activity data over the same relative period of time, e.g., as illustrated by the "NO" logical path of decision 320. In response thereto, in some approaches, the local minima may be determined to be an abnormality, and a next minima may be used for the reorganization, e.g., see sub-operation 322. In some approaches, the next minima is used for the reorganization in response to a determination that activity during the next minima has at least the predetermined degree of similarity with the historical read and write activity data over a same relative period of time.

Referring again to FIG. 3A, operation 304 includes reorganizing the data set before the estimated time. More specifically, the data set is reorganized at a time determined based on the reorganization analysis or derivative thereof. In some approaches, the time determined based on the reorganization analysis or derivative thereof is the local minima of the periods of relatively low utilization. For example, the time determined based on the reorganization analysis or derivative thereof may be the local minima of the periods of relatively low utilization in response to a determination that the activity during the local minima of the periods of relatively low utilization has at least a predetermined degree of similarity with the historical read and write activity data over a same relative period of time. In some other approaches, the time determined based on the reorganization analysis or derivative thereof is another minima along the time series model, e.g., a minima forecasted use of the data set before the time at which the total size of the data set will exceed the predetermined percentage of a maximum size of the data set.

Depending on the approach, reorganization of the data set may include performing a copy of the data set, e.g., a FlashCopy. In some other approaches, the reorganization of the data set may additionally and/or alternatively include reorganizing using a REPRO command, e.g., in a virtual storage access method (VSAM) by copying data from one file (such as an input file) to another file (such as an output file). Updates performed on the data set and/or other data sets in accordance with performing the reorganization may be added to a journal of updates, in some approaches. Furthermore, in some approaches, updates that occurred after the reorganization may optionally be applied. In some approaches, in response to a determination that less than or equal to a number of updates remain to be performed, method 300 may include short freezing the updates to the data set, and then performing a remainder of the updates and swapping journal data sets. For context, the reorganized version of the data set has all of the updates that go to the previous data set. Generally, an application is taken down (e.g., offline) during performance of the reorganization of the data set. In some approaches, the application may be taken down, and then the last updates may be applied and restarted. Another option, in some approaches, includes leaving the application up (e.g., functional and online) and pausing the updates while the catch up and swap takes place.

Various performance benefits are enabled within a data storage system as a result of performing the techniques described herein. For example, by organizing the data set from reaching a maximum size, system and application outages that otherwise would occur as a result of the data set reaching the maximum size are mitigated. This mitigation results in increased performance of a data storage system that include the data set, as the data set does not enter an offline state (other than potentially during the reorganizing). For context, the offline state that would otherwise occur without the techniques described herein is one in which the data set is unable to accept read write operations based on the data set reaching the maximum size. With respect to DASD-specific use cases, in order to restore a system or application, the control data set is allocated to a new location on the DASD and the records are sequentially read and written to a new potentially larger data set. This reorganization activity otherwise falling within periods of relatively high activity may cause severe business impacts. Accordingly, the techniques described herein may be used to identify a relatively optimal time to perform that reorganization, and automatically reorganize the data sets in such a way as to minimize the duration and impact of the reorganization.

Figure 4:
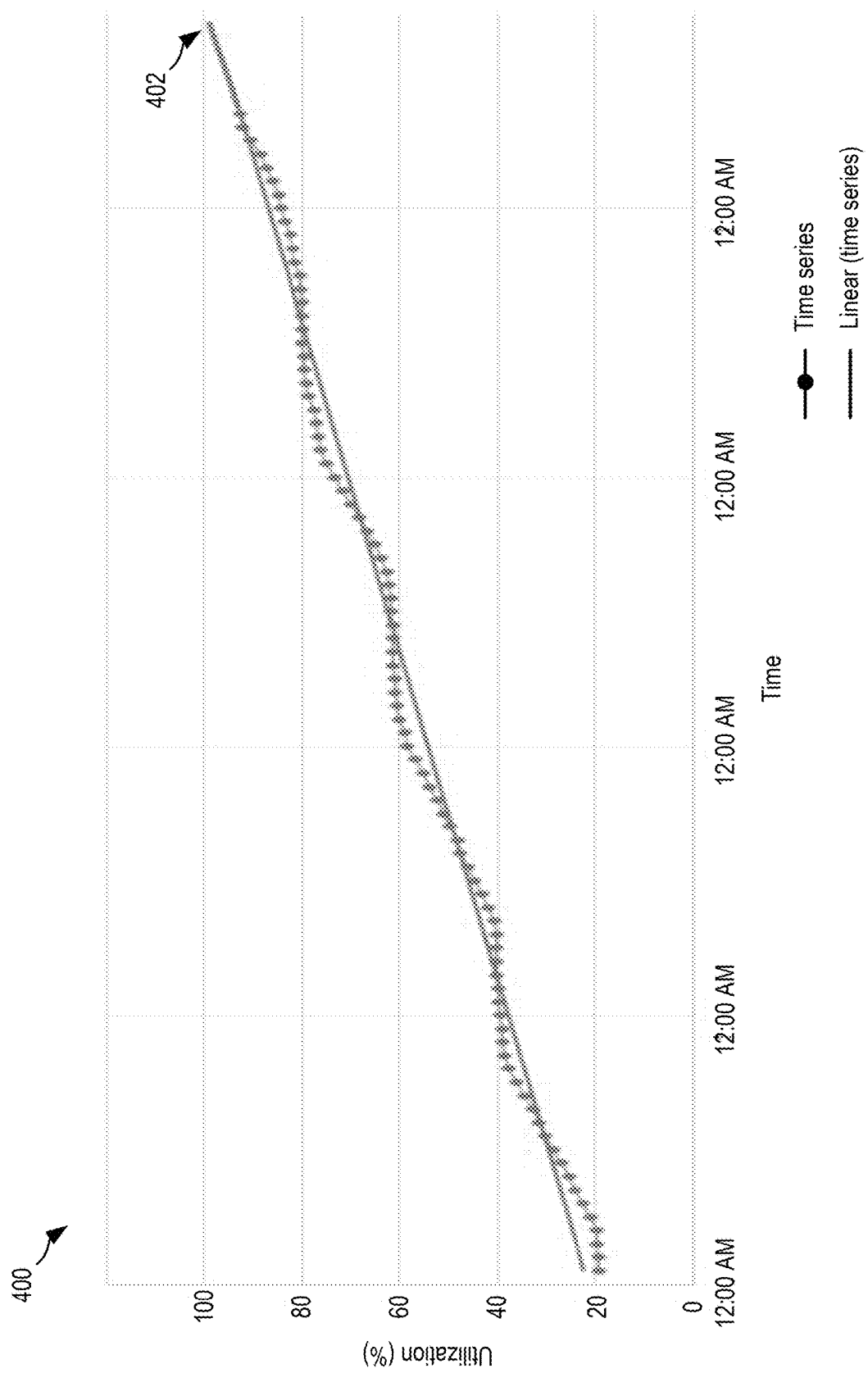
FIG. 4 is a line graph, in accordance with one embodiment of the present invention.

FIG. 4 depicts a utilization line graph 400, in accordance with one embodiment. As an option, the present utilization line graph 400 may be implemented in conjunction with features from any other embodiment listed herein, such as those described with reference to the other FIGS. Of course, however, such utilization line graph 400 and others presented herein may be used in various applications and/or in permutations which may or may not be specifically described in the illustrative embodiments listed herein.

Further, the utilization line graph 400 presented herein may be used in any desired environment.

The utilization line graph 400 includes a time series line that a plurality of write operations performed on a data set, e.g., see points along the time series line. These write operations change an overall utilization of the data set (see y-axis of the utilization line graph 400) over time (see x-axis of the utilization line graph 400). The utilization line graph 400 may be used in a reorganization analysis in order to estimating an amount of time until the data set reaches the maximum size of the data set, e.g., 100% utilization in the utilization line graph 400. In some approaches, this estimation is performed by extrapolating, from the linear regression analysis, utilization of the data set over time. For example, a linear line (time series) within the utilization line graph 400 may be generated based on the points of the time series line, and the linear line may be used to estimate, along the line graph, an amount of time until the data set will be fully utilized, e.g., see point 402 of the linear (time series).

Figure 5:
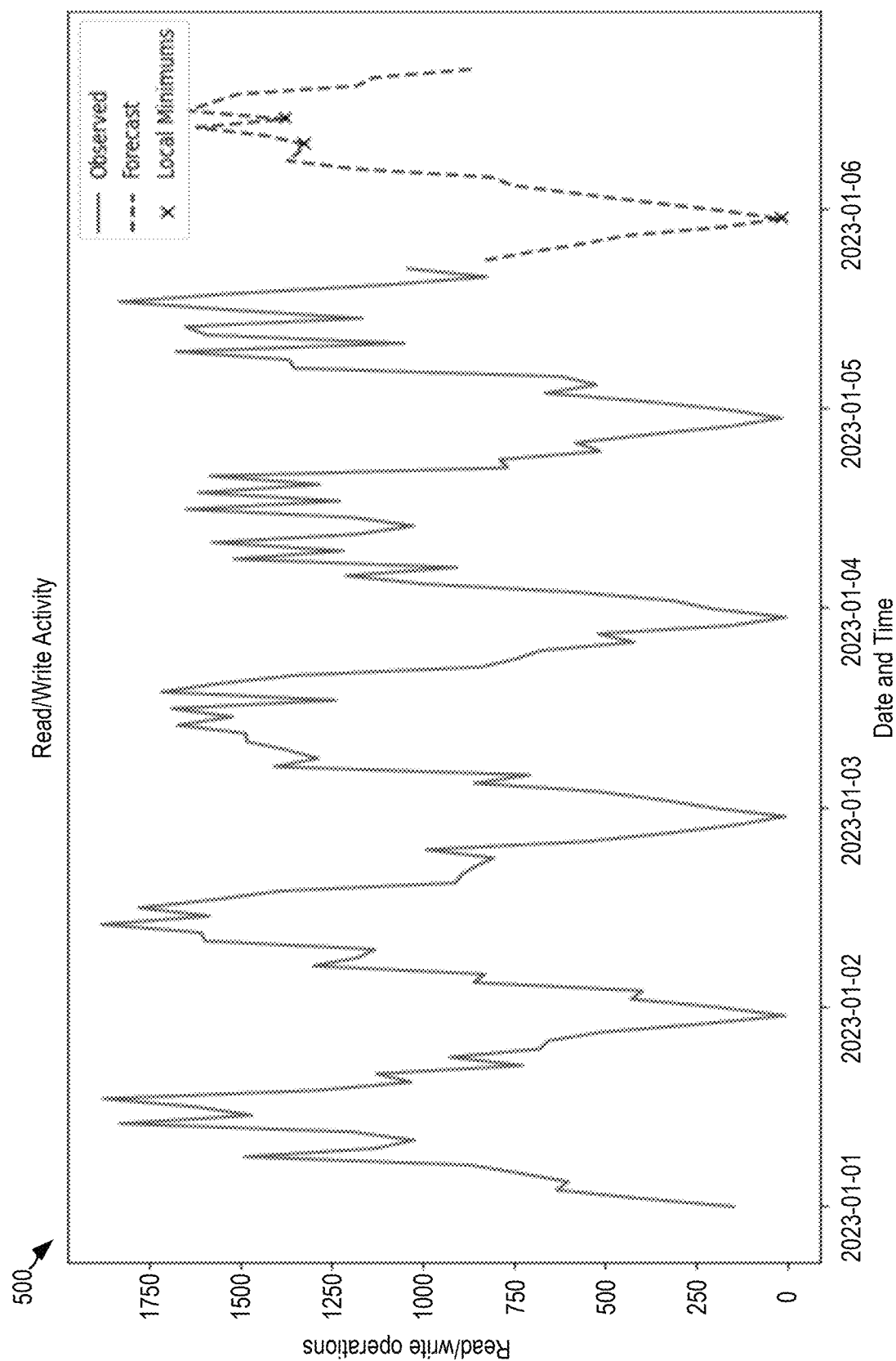
FIG. 5 is a line graph, in accordance with one embodiment of the present invention.

FIG. 5 depicts an operational line graph 500 (for read and write operations performed on a data set), in accordance with one embodiment. As an option, the present operational line graph 500 may be implemented in conjunction with features from any other embodiment listed herein, such as those described with reference to the other FIGS. Of course, however, such operational line graph 500 and others presented herein may be used in various applications and/or in permutations which may or may not be specifically described in the illustrative embodiments listed herein. Further, the operational line graph 500 presented herein may be used in any desired environment.

The operational line graph 500 includes an observed read/write line that over time details a number of read and/or write operations (see y-axis of the operational line graph 500) that are performed at a given time (see x-axis of the operational line graph 500). The operational line graph 500 may serve as a time series model that may be used to forecast, over the amount of time until the data set reaches the maximum size of the data set, periods at which relatively low utilization of the data set have and thereby may be likely to occur in the future, e.g., see "Forecast" line. Periods of relatively low utilization (see Local Minimums) may be identified in the forecast line, and techniques described in method 300 may be used to determine which of the minima to perform a reorganization of a data set at a determined time (where the data set is metadata).

Figure 6:
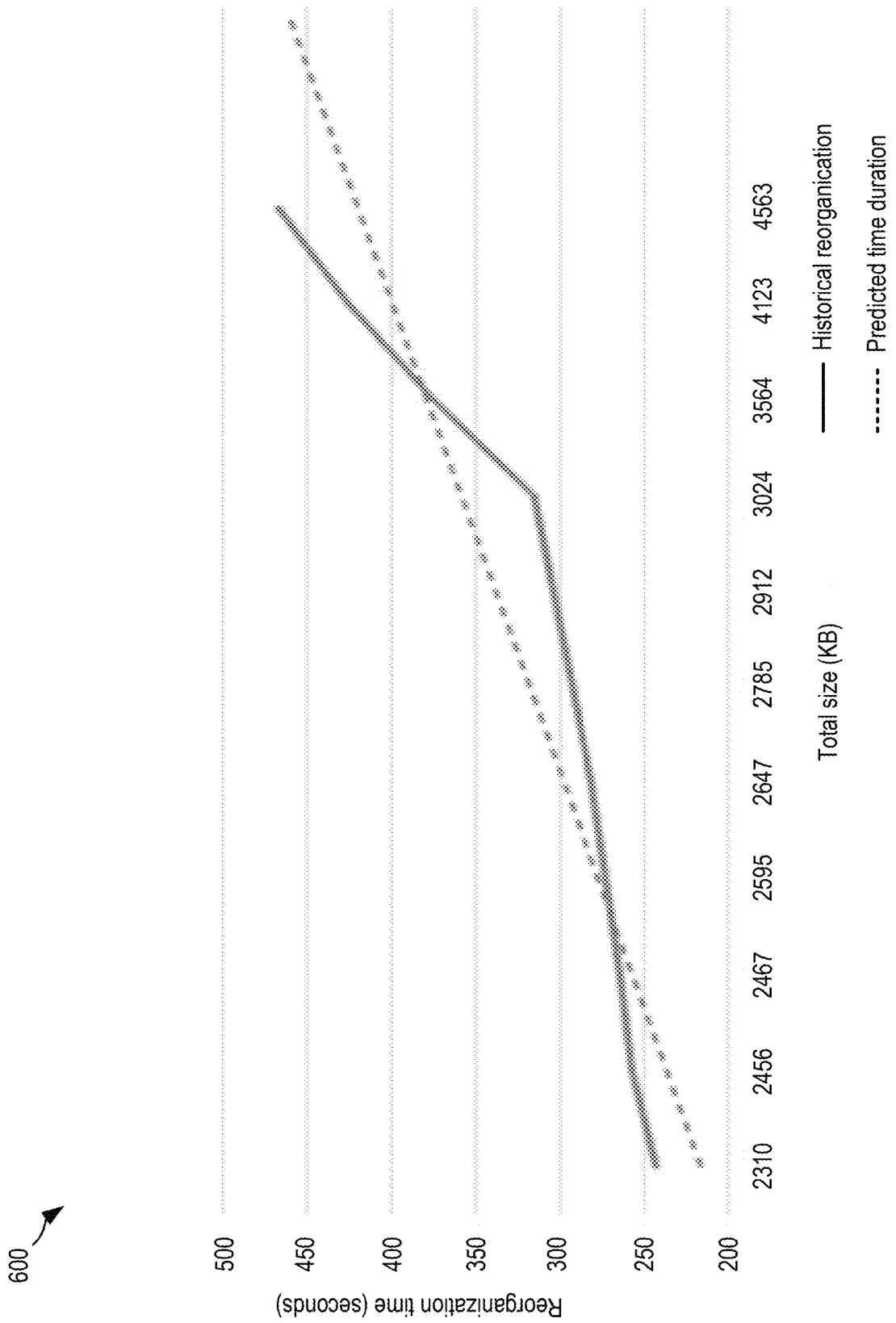
FIG. 6 is a line graph, in accordance with one embodiment of the present invention.

FIG. 6 depicts a historical line graph 600 (for previous reorganizations of data set(s)), in accordance with one embodiment. As an option, the present historical line graph 600 may be implemented in conjunction with features from any other embodiment listed herein, such as those described with reference to the other FIGS. Of course, however, such historical line graph 600 and others presented herein may be used in various applications and/or in permutations which may or may not be specifically described in the illustrative embodiments listed herein. Further, the historical line graph 600 presented herein may be used in any desired environment.

The historical line graph 600 includes a historical reorganization line that details one or more (such as a plurality in approaches in which the historical reorganization line represents an average of a plurality of previous data set reorganizations) previous data set reorganization times (see y-axis of the historical line graph 600) over different total sizes of one or more data sets (see x-axis of the historical line graph 600). Linear regression analysis may be used to predict a time duration that reorganization of a data set will take based on a total size of the data set, e.g., see predicted time duration line. In some approaches, techniques described in method 300 may be used to relate the predicted time duration to a previous data set reorganization time duration (of the same data set or another data set with at least a predetermined degree of similarity).

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method (CIM), the CIM comprising:
   performing a reorganization analysis for mitigating latency during reorganization of a data set, the reorganization analysis including:
   using regression analysis to predict a time duration that reorganization of the data set will take based on a total size of the data set,
   relating the predicted time duration to a previous data set reorganization time duration, and
   performing linear extrapolation to estimate a time at which the total size of the data set will exceed a predetermined percentage of a maximum size of the data set; and
   reorganizing the data set before the estimated time, wherein the data set is reorganized at a time determined based on the reorganization analysis or derivative thereof.

2. The CIM of claim 1, wherein the regression analysis used to predict the time duration that the reorganization of the data set will take includes linear regression analysis.

3. The CIM of claim 1, wherein the reorganization analysis includes: building a time series model to forecast activity of the data set, wherein building the time series model includes: monitoring read and write activity recorded in a journal data set on a direct access storage device (DASD) by using historical read and write activity data.

4. The CIM of claim 3, wherein the data set is a collection of metadata.

5. The CIM of claim 3, wherein the reorganization analysis includes: estimating an amount of time until the data set reaches the maximum size of the data set, wherein the estimating is performed by extrapolating, from the regression analysis, utilization of the data set over time.

6. The CIM of claim 5, wherein the reorganization analysis includes: forecasting from the time series model to determine, over the amount of time until the data set reaches the maximum size of the data set, periods of relatively low utilization of the data set, finding a local minima of the periods of relatively low utilization, and determining whether activity during the local minima of the periods of relatively low utilization has at least a predetermined degree of similarity with the historical read and write activity data over a same relative period of time.

7. The CIM of claim 6, wherein the time determined based on the reorganization analysis or derivative thereof is the local minima of the periods of relatively low utilization.

8. The CIM of claim 7, wherein the time determined based on the reorganization analysis or derivative thereof is the local minima of the periods of relatively low utilization in response to a determination that the activity during the local minima of the periods of relatively low utilization has at least a predetermined degree of similarity with the historical read and write activity data over a same relative period of time.

9. A computer program product (CPP), the computer program product comprising:
    a set of one or more computer-readable storage media; and
    program instructions, collectively stored in the set of one or more storage media, for causing a processor set to perform the following computer operations:
    perform a reorganization analysis for mitigating latency during reorganization of a data set, the reorganization analysis including:
        using regression analysis to predict a time duration that reorganization of the data set will take based on a total size of the data set,
        relating the predicted time duration to a previous data set reorganization time duration, and
        performing linear extrapolation to estimate a time at which the total size of the data set will exceed a predetermined percentage of a maximum size of the data set; and
    reorganize the data set before the estimated time, wherein the data set is reorganized at a time determined based on the reorganization analysis or derivative thereof.

10. The CPP of claim 9, wherein the regression analysis used to predict the time duration that the reorganization of the data set will take includes linear regression analysis.

11. The CPP of claim 9, wherein the reorganization analysis includes: building a time series model to forecast activity of the data set, wherein building the time series model includes: monitoring read and write activity recorded in a journal data set on a direct access storage device (DASD) by using historical read and write activity data.

12. The CPP of claim 11, wherein the data set is a collection of metadata.

13. The CPP of claim 11, wherein the reorganization analysis includes: estimating an amount of time until the data set reaches the maximum size of the data set, wherein the estimating is performed by extrapolating, from the regression analysis, utilization of the data set over time.

14. The CPP of claim 13, wherein the reorganization analysis includes: forecasting from the time series model to determine, over the amount of time until the data set reaches the maximum size of the data set, periods of relatively low utilization of the data set, finding a local minima of the periods of relatively low utilization, and determining whether activity during the local minima of the periods of relatively low utilization has at least a predetermined degree of similarity with the historical read and write activity data over a same relative period of time.

15. The CPP of claim 14, wherein the time determined based on the reorganization analysis or derivative thereof is the local minima of the periods of relatively low utilization.

16. The CPP of claim 15, wherein the time determined based on the reorganization analysis or derivative thereof is the local minima of the periods of relatively low utilization in response to a determination that the activity during the local minima of the periods of relatively low utilization has at least a predetermined degree of similarity with the historical read and write activity data over a same relative period of time.

17. A computer system (CS), the CS comprising:
    a processor set;
    a set of one or more computer-readable storage media; and
    program instructions, collectively stored in the set of one or more storage media, for causing the processor set to perform the following computer operations:
    perform a reorganization analysis for mitigating latency during reorganization of a data set, the reorganization analysis including:
        using regression analysis to predict a time duration that reorganization of the data set will take based on a total size of the data set,
        relating the predicted time duration to a previous data set reorganization time duration, and
        performing linear extrapolation to estimate a time at which the total size of the data set will exceed a predetermined percentage of a maximum size of the data set; and
    reorganize the data set before the estimated time, wherein the data set is reorganized at a time determined based on the reorganization analysis or derivative thereof.

18. The CS of claim 17, wherein the regression analysis used to predict the time duration that the reorganization of the data set will take includes linear regression analysis.

19. The CS of claim 17, wherein the reorganization analysis includes: building a time series model to forecast activity of the data set, wherein building the time series model includes: monitoring read and write activity recorded in a journal data set on a direct access storage device (DASD) by using historical read and write activity data.

20. The CS of claim 19, wherein the data set is a collection of metadata.

* * * * *